July 31, 1951  E. B. MOORE  2,562,433
COFFEE POT
Filed Dec. 15, 1947  3 Sheets-Sheet 1
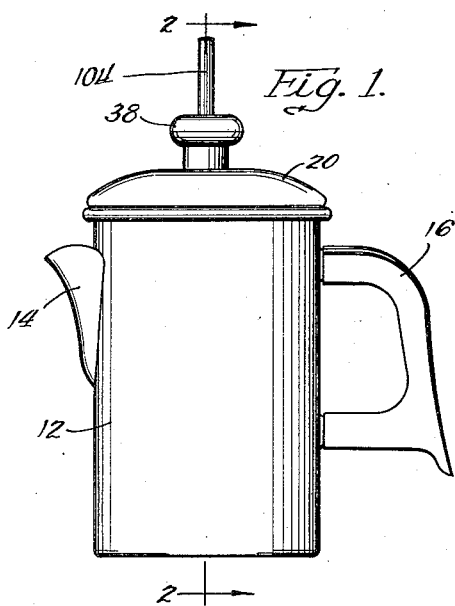
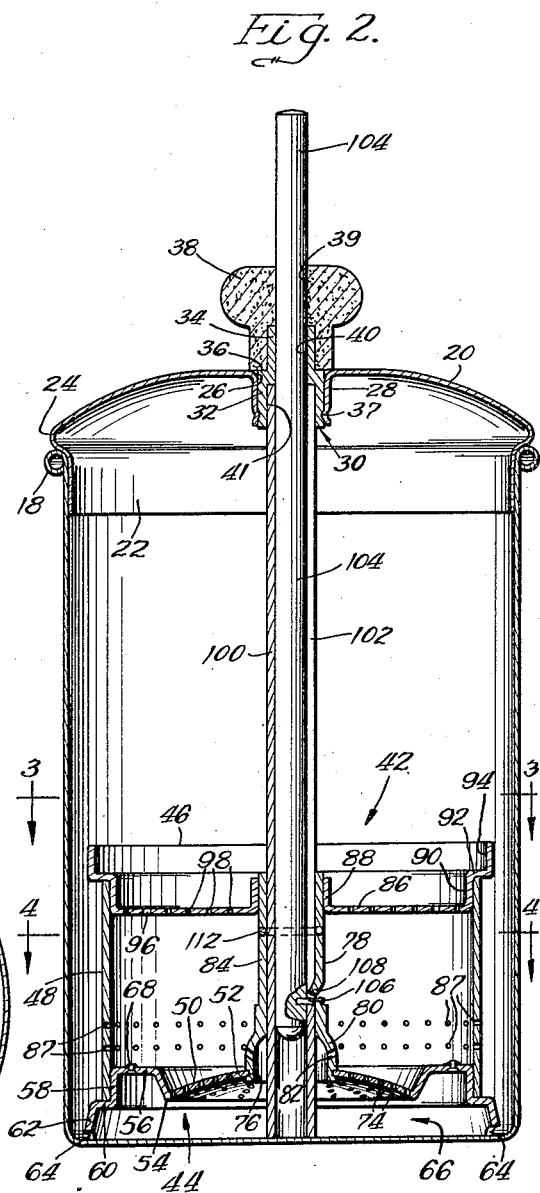
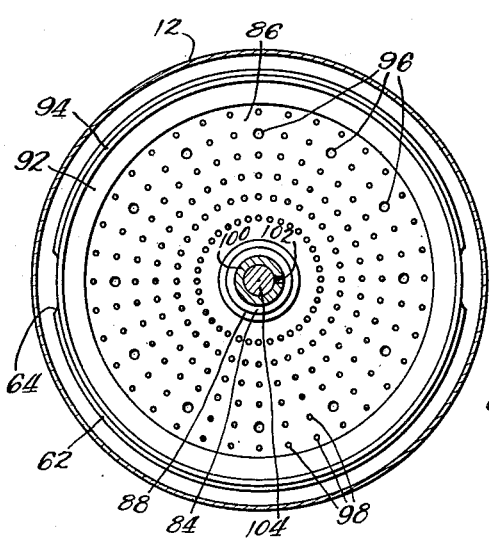
Inventor:
Emmett B. Moore
By Bair & Freeman
Attys.

July 31, 1951  E. B. MOORE  2,562,433
COFFEE POT
Filed Dec. 15, 1947  3 Sheets-Sheet 2

Inventor:
Emmett B. Moore
By Bair & Freeman
Attys.

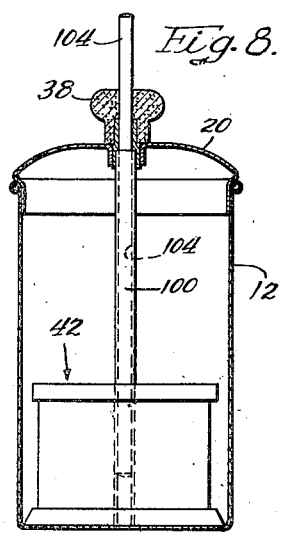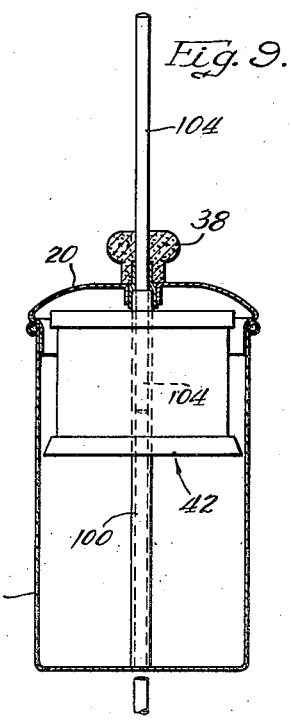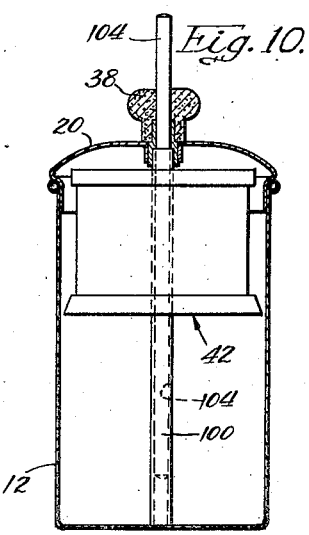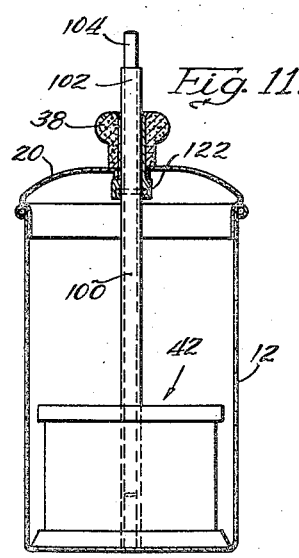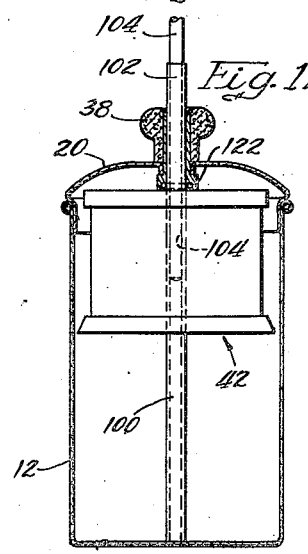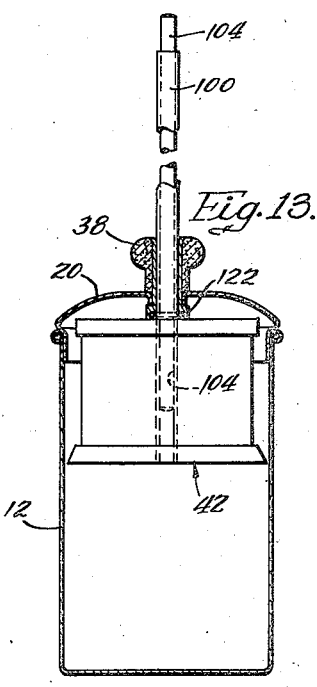
Inventor:
Emmett B. Moore
By Bair & Freeman
Attys Patented July 31, 1951

2,562,433

UNITED STATES PATENT OFFICE 2,562,433

COFFEE POT

Emmett B. Moore, Evanston, Ill.

Application December 15, 1947, Serial No. 791,679

1 Claim. (Cl. 99—319)

This invention relates to coffee pots.

An object of the present invention is the provision of a coffee pot by the use of which more rapid brewing of the coffee is accomplished than in former types of coffee pots.

Another object of the invention is the provision of a novel coffee pot in which the coffee begins to brew immediately upon application of heat to the coffee pot, and continues to brew throughout the continued application of heat thereto.

Another object of the invention is the provision of a coffee pot including a grounds container therefor, in which the grounds container can be immersed in the water and removed therefrom and retained above the water.

Another object is the provision of a coffee pot having such a grounds container and novel means by which the container can be immersed in and removed from the water in the pot; an operating means extends out of the pot, whereby the coffee pot can remain closed during such operations.

A further object of the invention is the provision of a coffee pot in which coffee can be brewed during the heating process of the water, during which time the escape of vapors is substantially less than after the water is heated, whereby the loss of aroma and beverage value is retained at a minimum, as contrasted with brewing the coffee only after the water is boiling.

The grounds container of the coffee pot is designed to rest on the bottom of the pot during the cooking process.

Still another object is the provision of a coffee pot including a grounds container which can be immersed in the water in the pot, in which circulation of water through the grounds in the container at a maximum rate is produced.

Another object of the invention is the provision of such a grounds container which, when raised out of the water in the pot, will carry out any grounds that may be suspended in the water.

With these and other objects in view, my invention consists in the construction, arrangement, and combination of the various parts of my device whereby the objects contemplated are attained as hereinafter more fully set forth, pointed out in my claim, and illustrated in the accompanying drawings, wherein:

Figure 1 is an illustration of a coffee pot in which the present invention is included;

Fig. 2 is an enlarged vertical section taken on line 2—2 of Figure 1;

Figure 3 is a horizontal sectional view taken on line 3—3 of Figure 2;

Figures 8, 9 and 10 illustrate various positions of the grounds container of the type illustrated in Figure 2; and Figures 11, 12 and 13 illustrate various positions of the grounds container to which is applied the modified form of device illustrated in Figure 6.

Figure 4:
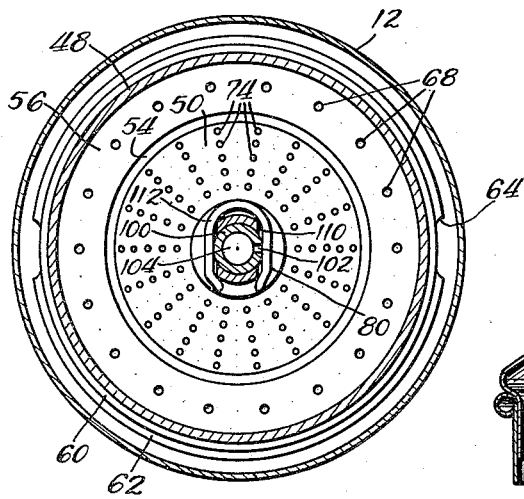
Figure 4 is a horizontal sectional view taken on line 4—4 of Figure 2.

Referring now in detail to the drawings, and particularly Figures 1 to 5, inclusive, the coffee pot to which the present invention is applied includes a coffee pot proper or vessel 12 having the ordinary spout 14 and a handle 16. It will be noted that the wall of the vessel 12 is uniform throughout its height without variation in diameter. The upper peripheral rim of the vessel 12 may be provided with a bead 18 if desired.

A cover 20 is provided for the vessel and has a depending peripheral flange 22 adapted to be inserted into the upper end of the vessel 12 and have substantial frictional engagement with the latter. The cover may be provided with the usual bead or circumferential extension 24 to limit the extent to which the flange 22 is inserted in the vessel. The cover 20 is formed with a central opening 26 surrounding which is a short downturned flange 28. A sleeve 30 which may be metal is inserted in the opening 26. The sleeve 30 has a lower enlarged portion 32 and an upper portion 34 of reduced outer diameter forming a shoulder 36. The sleeve 30 is inserted through the opening 26 from the underside thereof and is held therein by means of a detent 37 formed in the flange 28 and engageable in a recess in the sleeve. A knob 38 having a central opening 39 is inserted over the upper portion 34 and engages the shoulder 36 which is substantially flush with the top surface of the cover 20. The knob 38 may be of fiber or other desired material and is held on the portion 34 in any suitable manner, such as by a press fit. The opening 40 through the sleeve 30 terminates in an enlarged recess 41 at the lower end thereof.

A grounds container 42 is inserted in the vessel 12 and adapted to rest on the bottom thereof as illustrated in Figure 2 and to be raised upwardly from that position, as will be described later. The grounds container 42 for purposes of general reference contains a bottom closure element 44, a top closure element 46, and a surrounding wall 48. The bottom closure element 44 may also be referred to as a casing and, for the most part, is made up of a single perforated stamping. The bottom closure element 44 includes a central portion 50 which is generally dome-shaped having a concave surface facing downwardly. The portion 50 includes an upper portion 52 adjacent the center thereof and a lower portion 54 forming the peripheral margin of the dome-shaped portion 50. Surrounding the peripheral portion 54 and extending upwardly therefrom is a raised annular portion 56 which, it will be noted, is also concave with its concave surface directed downwardly. Surrounding the outer marginal edge of the raised portion 56 is a vertical flange 58 and surrounding the lower marginal edge of the flange 58 is a horizontal flange 60 and finally a generally vertical flange 62 is formed on the outer peripheral edge of the horizontal flange 60. The flange 62 may be directly vertical or it may be tapered outwardly downwardly as illustrated in Figure 1. Notches 64 are cut in the lower edge of the flange 62 on opposite sides thereof.

When the flange 62 tapers as illustrated in Figure 2, the lower peripheral edge thereof may encompass substantially all of the surface area of the bottom of the vessel. If the flange 62 is directly vertical, a slight space must be provided between the flange and the side wall of the vessel 12.

It will be noted that the flange 62 extends considerably below the depressed portion 54 of the dome 50 so that the general effect of the lower closure element 44 is concave with its concave surface facing downwardly. Thus, a space 66 of considerable extent is provided between the bottom closure element 44 and the bottom of the vessel. The bottom closure element 44 may also be described as being upwardly embossed.

The upper annular portion 56 of the bottom closure element 46 is provided with a plurality of holes 68 which will be termed relatively large holes. The construction of these holes is illustrated in detail in Figure 5. The holes 68 are formed as by piercing, providing an upwardly extending portion 70 covering a space 72 therebelow. The holes 68 are, therefore, positioned above the plane of the upper portion 56. The dome portion 50 is provided with a plurality of holes 74 which will be referred to as relatively small holes.

The dome portion 50 is provided with a central opening 76 in which is secured a tubular element 78. The tubular element 78 includes a lower enlarged portion 80 provided with a series of holes 82 spaced circumferentially therearound. The holes 82 are approximately the size of the large holes 68. The tubular portion 78 may be secured in the central opening 76 by any convenient or desired means and is intended to be permanently secured therein. The tubular portion 78 also includes an upper reduced diameter portion 84 which may conveniently be formed integral with the lower enlarged portion 80.

The surrounding wall 48, as illustrated in Figure 1, is inserted on the lower closure element 44 by sliding it over the vertical flange 58 until the lower edge of the wall engages the horizontal flange 60. The wall 48 may be separable as illustrated, in which case a press fit engagement is accomplished to retain the wall semi-permanently on the lower closure element 44. If desired, the wall 48 may be permanently secured to the lower closure element as by soldering or welding. A plurality of holes 87 are formed in the surrounding wall 48 adjacent the lower part thereof and positioned slightly above the upper portion 56 of the lower closure element 44. The holes 87 are approximately the size of the small holes 74.

The upper closure element 46 includes a main horizontal portion 86 having a central opening and an upturned flange 88 surrounding the central opening. Surrounding the outer edge of the main portion 86 is a vertical peripheral flange 90, formed at the top of which is an outwardly extending horizontal flange 92 and finally surrounding the outer marginal edge of the flange 92 is an upwardly extending vertical peripheral flange 94. The top closure element 46 is put in place by inserting the vertical flange 90 in the upper end of the surrounding wall 48 until the horizontal flange 92 engages the top edge of the wall. At the same time, the central opening surrounded by the flange 88 receives the tubular element 78. The top closure element 46 is intended to be frictionally held in place in the coffee brewing operation but easily removed by the user when grasped by the hand. The horizontal portion 86 of the top closure element 46 is provided with a series of relatively large holes 96 of approximately the size of the holes 68 and a plurality of relatively small holes 98 of approximately the size of the holes 74.

A vertical tube or sleeve 100 is inserted through the tubular element 78 in the container 42 and the lower end thereof is adapted to rest on the bottom of the vessel 12. The upper end of the sleeve 100 extends into the recess 40 in the sleeve 30 in the cover and engages the upper surface of the recess. When the cover is placed on the vessel and pressed down into closed position, the cover retains the tube or sleeve 100 in position, both laterally and vertically. The tube or sleeve 100 is provided with a vertical slot 102 opening out of the upper end of the tube and extending downwardly therein into the tubular member 78 and terminating slightly above the bottom of the reduced diameter portion 84 of the tubular element 78. A rod 104 is inserted in the tube 100 and slidable vertically therein. The rod 104 has a lateral projection 106 formed adjacent the bottom thereof. The projection 106 may be in the form of a pin inserted in a hole in the rod. The pin 106 extends into and slides in the vertical slot 102 and when the pin 106 reaches and engages the bottom of the slot the rod 104 is prevented from sliding further downwardly. When the rod 104 is at its lowermost position, the lower end of the rod may be spaced upwardly from the bottom of the tube 100 if desired. The upper end of the rod 104 extends upwardly through the reduced opening 40 in the sleeve 30 and out through the opening in the knob extending a short distance above the latter. A lug 108 is struck in from the reduced diameter portion of the tubular element 78 and extends into the slot 102 in the tube 100. The lower end of the lug 108 is positioned slightly above the bottom of the slot to provide space for the pin 106. In assembling the device, the rod 104 is inserted in the tube 100 from the top of the latter and the two together are inserted through the tubular element 78 from the bottom of the latter until the pin 106 engages the lug 108, preventing further movement therein.

The side wall of the reduced portion 84 of the tubular element 78 is provided with a slot or cut-out portions 110 (Figure 4) on opposite sides thereof. A spring member 112 in the form of a U is inserted in the cut-out portions 110. The spring 112 is biased inwardly into friction engagement with the outer surface of the vertical tube 100.

Figure 6:
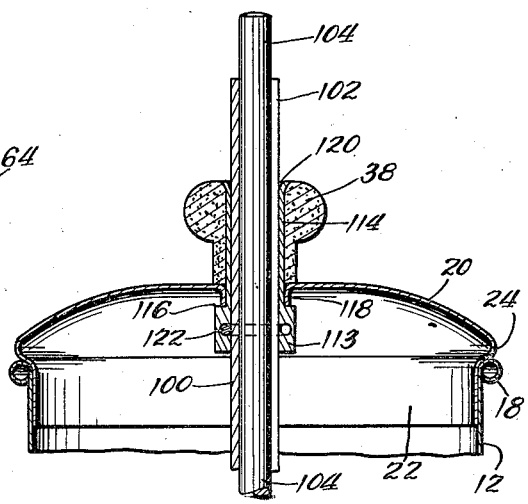
Figure 6 is a vertical sectional view of the upper part of the coffee pot showing a modified form.
Figure 5:
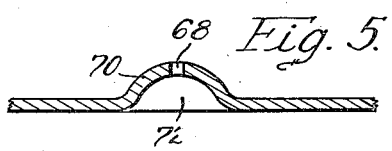
Figure 5 is an enlarged detail view of one of the openings in the lower part of the grounds container.

The construction of the device of Figure 6 is slightly different from that heretofore described. In Figure 6, the sleeve 30 is provided with an enlarged bottom portion 113 and an upper reduced portion 114 forming a shoulder 116. The central opening in the cover 20 is provided with a short downturned flange 118 and the sleeve 30 is inserted through the opening from the bottom thereof until the shoulder 116 engages the flange 118. The knob 38 is inserted over the reduced portion 114 and the upper end of the latter is turned outwardly as indicated at 120 to secure the knob in place on the cover. The central opening in the sleeve 30 is uniform in diameter throughout.

In Figure 6, the tube 100 extends through the sleeve 30 and out of the upper end thereof and out of the knob. The rod 104 extends through the tube 100 and out of the upper end of the latter. The enlarged portion 113 of the sleeve 30 is provided with horizontal cut-out portions similar to the cut-out portions 110 in the tubular element 78. A spring 122 in the form of a U is inserted in the cut-out portions. The spring 122 is biased inwardly into substantial friction engagement with the outer surface of the tube 100.

Figure 7:
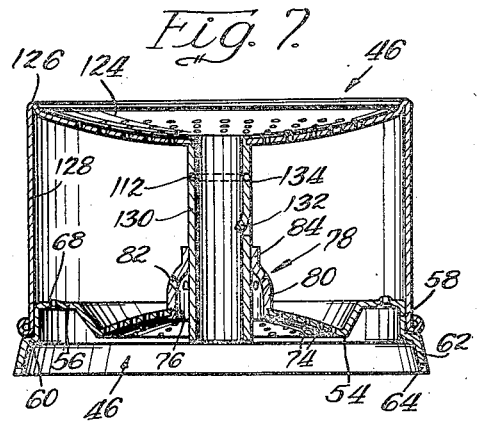
Figure 7 is a vertical sectional view of a modified form of grounds container.

Figure 7 shows a modification of grounds container. In this figure, the bottom closure element 46 is substantially the same as that of Figure 2. However, in the present instance, the reduced dimension portion 84 of the tubular element 78 terminates a short distance above the dome portion 50 and considerably below the upper closure element. The upper closure element 46 in Figure 7 consists of a downwardly embossed or concave main portion 124 having its concave surface facing upwardly. Surrounding the portion 124 is a vertical bead 126 and extending downwardly therefrom is a surrounding wall 128 formed integral with the upper portion 124. The central opening in the portion 124 is provided with a downwardly extending tubular element 130 permanently secured to the portion 124 in any convenient manner. The tubular portion 130 extends through the tubular element 78 down below the enlarged portion 80 of the latter. The outer diameter of the tubular portion 130 is such as to provide substantial sealing engagement with the inner surface of the reduced portion 84 so as to prevent the passage of coffee grounds or water therethrough. The tubular portion 130 is provided with a struck-in lug 132 and a horizontal cut-out portion 134 for the reception of the U-shaped spring 112 similarly to the tubular element 78 in Figure 2.

The tubular element 130 is adapted to receive the vertical tube 100 and rod 104 in the same manner as described in connection with the previous embodiment. The top closure element 46 in this instance (Figure 7) which includes the top portion 124 and surrounding wall 128 as well as the tubular element 130 is an adaptation of the grounds container of a conventional percolator although inverted.

The grounds containers illustrated in Figure 7 may be employed with either of the forms of cover illustrated in Figures 2 and 6.

Use and operation

The grounds container 42 of any of the embodiment is of a capacity for a potful of coffee. The top closure element 46 is removed and the grounds poured into the container and the top closure element replaced thereon. The rod 104 is inserted in the tube 100 from the top and the two together are inserted through the tubular element 78 from the bottom thereof. The container is then lowered into the vessel and the vessel cover placed thereon with the upper end of the rod 104 extending through the knob and out the top thereof.

The coffee may be brewed by immersing the coffee grounds in cold water and placing the pot on the stove. When heat is applied, it is effective first on that portion of the water at the bottom of the vessel. The bottom closure element or casing 44 covers substantially all of the bottom of the vessel and any vapors generated by the heat or heated water currents are trapped in the space 66 under the grounds container. The vapors and heated currents of water arising in the water under the container cause the water to flow upwardly through the large holes 68 and 82, (Figures 1 to 7). As pointed out above, the large holes 68 and 82 are in elevated positions or at the top of the space 66. The coffee grounds exert pressure against the bottom closure element 44 and prevent substantial passage of water through the small holes 74. The space between the enlarged portion 80 of the tubular element 78 and the tube 100 forms a trap elevated above the main space 66 under the container and vapors form pressure therein to force the water through the holes 82.

The vapors and heated water currents which are generated exert considerable upward pressure on the grounds container and would tend to lift the grounds container off of the bottom of the vessel if it were not for means preventing such action. The spring 112 having a frictional engagement with the tube 100 exerts sufficient pressure to hold the grounds container from upward movement on the tube 100. Frictional engagement between the cover and the vessel acts through the tube 100 and retains the tube and grounds container at the bottom of the vessel against the action of the pressure of the vapors and heated water currents. When water is forced through the openings 68 and 82, it passes into the grounds in the container and then passes upwardly and out through the large holes 96 in the upper closure element 46. Water may also pass out through the holes 87 in the surrounding wall 48. The particular positioning of the holes 68 and 82 in the bottom element 44 together with the particular positioning of the holes 87 and 96 assures that water will pass in all directions through the coffee grounds. The water then passes into the body of the vessel and returns downwardly around the grounds container and in through the notches 64 under the grounds container and recirculates.

Because of the fact that vapors and heated water currents rise immediately upon the application of heat, water is circulated through the coffee grounds and the coffee begins to brew immediately upon the application of heat. This is advantageous over previous types of coffee pots in which the water must be boiling before the brewing action takes place. In the case when water is boiling before brewing action takes place, vapors escape from the water and carry off much of the flavor and beverage value of the coffee. In the present instance wherein brewing begins immediately upon the application of heat, the brewing is substantially completed when the water is brought up to the boiling point and the escape of vapors is held at a minimum with consequent saving in the beverage value of the coffee.

Figures 8, 9 and 10 illustrate the manner in which the grounds container is raised out of the water. Figure 8 illustrates the grounds container at the bottom of the vessel. When the brewing process is complete, the user grips the upper end of the rod 104 and raises it. The pin 106 engages the lug 108 and lifts the grounds container up. The tube 100 is prevented from being raised by the cover which is frictionally held in the vessel. When the grounds container is elevated to the position of Figure 9, the friction between the spring 112 and the tube 100 retains the container at the top. The rod 104 is then released and drops to its original position.

The grounds container can be left in the coffee pot and need not be taken out when coffee is served.

When the grounds container 42 is raised or elevated as just described, any dregs or small particles of coffee grounds that may be floating in the water in the vessel are caught in the upper closure element 46 and carried out of the water. The coffee remaining is then clear and substantially without any noticeable solid particles.

The action of raising the grounds container causes water to be withdrawn out of the container rapidly. The space 66 under the grounds container creates a partial vacuum due to the raising action and the water is rapidly drawn through the grounds.

If desired, clear water may be poured in the upper closure element 46 for rinsing the grounds and carrying out the residual liquid coffee retained by the grounds.

Figure 6, together with Figures 11, 12 and 13, illustrate a means by which the grounds container can be lowered without removing the cover from the vessel. To raise the grounds container, the user grips the upper end of the tube 100 with one hand and grips the rod 104 with the other. He raises the rod 104 and holds the tube 100 down. The grounds container is drawn upwardly as described above and retained in its elevated position by the spring 112. The rod 104 can then be released and dropped.

When it is desired to lower the grounds container, the user grips the upper end of the tube 100 and raises it to the point where the pin 106 engages the lug 108. The user then forces the tube 100 downwardly which carries the grounds container to the bottom of the vessel. Figure 11 illustrates the device of this embodiment, in which the grounds container is at the bottom in the position it assumes when the coffee is brewing. Figure 12 illustrates the grounds container at the top of the vessel and the tube 100 in its original position. Figure 13 illustrates the position of the parts when the tube 100 is raised. The user can then force the rod 100 downwardly, carrying the grounds container to the bottom of the vessel.

The spring 122 may be stronger than the spring 112, if desired, so that when the user raises the rod 104, the grounds container slides over the tube 100 and the tube 100 is prevented from rising upwardly through the cover.

It is important to note that for complete and thorough brewing of coffee that there must be not only saturation of the grounds but also circulation. Water must reach all parts of the grounds in the container and the water must move therethrough to carry the beverage value from the grounds. The positioning of the holes and perforations in the various elements making up the container has been carefully done to assure that all portions of the grounds are affected by the water. For example, if a small quantity of coffee is desired to be made and the water in the vessel does not reach the top of the grounds container, the circulating water passing through the holes in the bottom closure element will pass into the grounds which do not fully fill the container and pass out through the holes 87 in the surrounding wall 48.

Since the heat applied during the brewing operation is concentrated on that small quantity of water contained under the grounds container, circulation begins almost immediately and the brewing action is rapid. The flavor is extracted from the coffee grounds by the time the total quantity of water is brought to the boiling point.

Due to the fact that the brewing action commences immediately upon the application of heat and that it is complete when the water is brought up to the boiling point, greater efficiency is obtained. There is less loss of flavor from vapors which would escape if the water continued to boil. As a result, it is possible to obtain greater amounts of palatable beverage from a given amount of grounds.

Some changes may be made in the construction and arrangements of the parts of my coffee pot without departing from the real spirit and purpose of my invention, and it is my intention to cover by my claim such modified forms of structure or use of mechanical equivalents as may be reasonably included within their scope.

I claim as my invention:

A coffee pot comprising, in combination, a vessel, a friction held cover for the vessel, said cover having a tubular opening therethrough, a perforated grounds container adapted to rest on the bottom of the vessel, said grounds container having a vertical tubular opening therethrough, a vertical tube positioned in the tubular opening in said grounds container and extending from the bottom of the vessel through the tubular opening in the cover and having a portion extending above the latter tubular opening, said grounds container being slidable vertically on said tube, the wall forming the tubular opening in said grounds container having lateral cut-out portions, spring means in said cut-out portions biased into friction engagement with said tube, the wall forming the tubular opening in the cover having lateral cut-out portions, spring means in said last-named cut-out portions biased into friction engagement with said tube, said tube having a slot extending from the top thereof to a point above the bottom of the tubular opening in said grounds container, a rod slidable in said tube, said rod having a lateral projection extending into said slot, said projection having operable engagement with said grounds container, the upper end of said rod extending above the upper end of said tube when said rod is in its lowermost position in said tube.

EMMETT B. MOORE.

REFERENCES CITED

The following references are of record in the file of this patent:

UNITED STATES PATENTS

| Number | Name | Date |
| --- | --- | --- |
| 158,532 | Shattuck | Jan. 5, 1875 |
| 208,391 | Hinkle | Sept. 24, 1878 |
| 523,656 | Carpenter | July 31, 1894 |
| 645,277 | Towville | Mar. 13, 1900 |
| 786,666 | McKenzie | Apr. 4, 1905 |
| 793,655 | Haley | July 4, 1905 |
| 902,111 | Robinson | Oct. 27, 1908 |
| 1,127,780 | Konar | Feb. 9, 1915 |
| 1,579,636 | Borgnis | Apr. 6, 1926 |
| 2,050,303 | Forshee | Aug. 11, 1936 |
| 2,169,430 | Reinholy | Aug. 15, 1939 |
| 2,344,386 | Berger | Mar. 14, 1944 |